(12) United States Patent
Thomasset et al.

(10) Patent No.: US 8,580,363 B2
(45) Date of Patent: Nov. 12, 2013

(54) FLEXIBLE MULTILAYER STRUCTURE FOR TUBES

(75) Inventors: Jacques Thomasset, Vouvry (CH); Stéphane Mathieu, Vouvry (CH)

(73) Assignee: Aisapack Holding S.A., Vouvry (CH)

( * ) Notice: Subject to any disclaimer, the term of this patent is extended or adjusted under 35 U.S.C. 154(b) by 705 days.

(21) Appl. No.: 12/296,200

(22) PCT Filed: Apr. 6, 2007

(86) PCT No.: PCT/IB2007/051248
§ 371 (c)(1),
(2), (4) Date: Jan. 21, 2009

(87) PCT Pub. No.: WO2007/113781
PCT Pub. Date: Oct. 11, 2007

(65) Prior Publication Data
US 2009/0176044 A1    Jul. 9, 2009

(30) Foreign Application Priority Data

| Apr. 6, 2006 | (WO) | PCT/IB2006/051052 |
| Jul. 31, 2006 | (EP) | 06118170 |
| Jul. 31, 2006 | (EP) | 06118199 |
| Nov. 24, 2006 | (WO) | PCT/IB2006/054420 |

(51) Int. Cl.
*B32B 1/02* (2006.01)
*B32B 1/08* (2006.01)
*B32B 23/00* (2006.01)

(52) U.S. Cl.
USPC ....... 428/35.2; 428/34.1; 428/34.2; 428/35.7; 428/35.9; 428/36.9

(58) Field of Classification Search
USPC ............ 428/34.1, 35.7, 35.9, 36.9, 34.2, 35.2
See application file for complete search history.

(56) References Cited

U.S. PATENT DOCUMENTS

| 4,401,136 A * | 8/1983 | Porrmann et al. ......... 138/118.1 |
| 4,720,420 A * | 1/1988 | Crass et al. .................... 428/216 |
| 6,221,410 B1 * | 4/2001 | Ramesh et al. .............. 426/105 |
| 6,994,912 B2 * | 2/2006 | Grund et al. ............... 428/474.4 |

FOREIGN PATENT DOCUMENTS

| EP | 0 177 470 | 4/1986 |
| EP | 1 380 514 | 1/2004 |
| GB | 1 281 869 | 7/1972 |

OTHER PUBLICATIONS

International Search Report for PCT/IB2007/051248, mailed Sep. 24, 2007.

\* cited by examiner

*Primary Examiner* — Marc Patterson
(74) *Attorney, Agent, or Firm* — Nixon & Vanderhye P.C.

(57) ABSTRACT

The invention relates to a flexible packaging tube formed from a laminate comprising at least one first layer and one second layer, characterized in that the first layer is formed from a material whose properties make it possible to weld the first layer to itself and in that the second layer is formed from a material whose properties make it impossible to weld the second layer onto the first layer.

6 Claims, 1 Drawing Sheet

FLEXIBLE MULTILAYER STRUCTURE FOR TUBES

Figure 1:
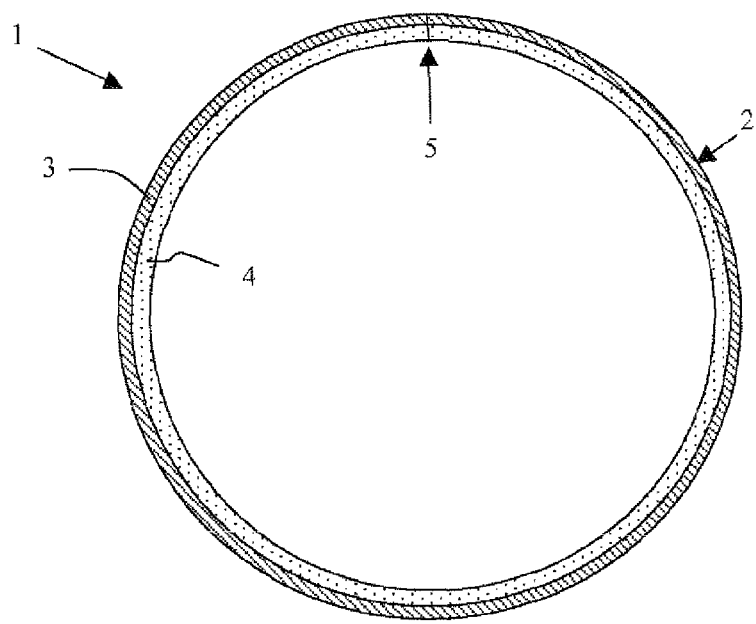

This application is the U.S. national phase of International Application No. PCT/IB2007/051248, filed 6 Apr. 2007, which designated the U.S. and claims priority to National Phase Application No. PCT/IB2006/051052, filed 6 Apr. 2006, European Application No(s) 06118170.7, filed 31 Jul. 2006, 06118199.6 filed 31 Jul. 2006 and National Phase of PCT/IB2006/054420 filed 24 Nov. 2006, the entire contents of each of which are hereby incorporated by reference.

FIELD OF THE INVENTION

The invention lies in the packaging field and aims to improve flexible tubes formed using plastic films. More specifically, it relates to a multilayer tube structure and its method of manufacture.

PRIOR ART

Flexible tubes are commonly used to package toothpaste, cosmetic products, pharmaceutical products or else food products.

Many flexible tubes are made from a laminate the ends of which are joined by welding in order to form the flexible tubular body. Welding of the tubular body is carried out by superposing the ends of the laminate and welding the surfaces at the overlap. A tube head is then welded or overmoulded onto this tubular body.

The laminates commonly used result from the lamination of three films:
- A first film forming the upper surface of the laminate and the outer surface of the packaging. It is generally printed and often comprises several layers. It is welded to the third film at the overlap of the laminate ends. Preferably, this first film is formed from polyolefins in order for the packaging to be made by welding at high production rates.
- A second film, trapped between the first and third films, forming the central part of the laminate and often offering barrier properties, such as a low permeability to aromas or to oxygen. The second film consists, for example, of an aluminium foil or of a multilayer film comprising a barrier polymer such as ethylene-vinyl alcohol (EVOH).
- A third film forming the lower surface of the laminate and the inner surface of the packaging. This film is in contact with the packaged product and guarantees the hygiene properties of the packaging. It is welded to the first film at the overlap of the laminate ends. It is also joined by welding to the tube head. The third film is often a multilayer film and formed from polyolefins in order to enable welding at high production rates.

The subject of Patent Application EP 2 701 926 is a tube formed from a multilayer flexible skirt comprising one layer having a barrier effect towards oxygen and aromas; said layer being trapped between several polyolefin-based layers. The total thickness of the layers located between the barrier effect layer and the inner surface of the packaging is between 55 and 135 microns in order to better contain the aromas.

Patent Application EP 203 265 provides a multilayer laminate for making flexible tubes having a high stress cracking resistance. The multilayer structure comprises a layer of linear low-density polyethylene (LLDPE) forming the inner surface of the tube. Said LLDPE layer enables high-speed welding onto the outer polyethylene layer and has a high resistance to the generation of dust by rubbing. EP 203 265 provides the following preferential multilayer structure; the layers being listed from the upper layer forming the outer surface of the tube towards the lower layer of the laminate forming the inner surface of the tube: PE-PE-paper-LDPE-adhesive-aluminium-adhesive-LLDPE.

U.S. Pat. No. 4,418,841 provides a laminate having a high strength thanks to a biaxially-oriented polypropylene (BOPP) film embedded in the structure. The tube comprises, in addition, a layer of linear low-density polyethylene (LLDPE) that substantially improves the stress cracking resistance and the resistance to the formation of dust by rubbing U.S. Pat. No. 4,418,841 provides the following preferential multilayer structure; the layers being listed from the upper layer forming the outer surface of the tube towards the lower layer of the laminate forming the inner surface: LDPE-LDPE-paper-PEI-OPP-PEI-EAA-aluminium-EAA-LLDPE.

U.S. Pat. No. 5,051,266 provides a flexible tube composed from a laminate of which the lower layer forming the inner surface of the packaging is formed from a blend of ethylene-vinyl acetate (EVA) and an ethylene/acrylic acid copolymer. At least the inner layer of the laminate is irradiated. The tube is used for in situ cooking of the packaged product; the tube being immersed in a water bath. The multilayer structure provided in U.S. Pat. No. 5,051,266 improves the contact between the product and the inner surface of the tube.

Problem to be Solved

The tubes provided in the prior art are made from laminates comprising numerous layers making it possible to:
- guarantee sufficient barrier properties;
- enable high-speed welding;
- have a printed or printable outer surface;
- guarantee resistance to stress cracking;
- prevent the formation of dust by rubbing;
- have a sufficient strength; and
- guarantee hygiene properties in regard to the packaged product.

It is of great interest to reduce the number of layers of these laminates in order to simplify their method of manufacture and result in more economical laminates.

Definition of the Terms Used in the Summary of the Invention

In the summary of the invention the following terms and abbreviations are used:
Laminate: multilayer film resulting from the lamination of several films;
BOPET: biaxially-oriented polyethylene terephthalate;
BOPP: biaxially-oriented polypropylene;
BOPA: biaxially-oriented polyamide;
PE: polyethylene;
LDPE: low-density polyethylene;
LLDPE: linear low-density polyethylene;
HDPE: high-density polyethylene;
EVOH: ethylene-vinyl alcohol;
Adhesive: adhesive used during the preparation of the laminates to join several films together;
Glue: adhesive product used to bond the strip to the laminate;
Welding: welding operation aiming to join, by melting, two materials having the same nature or that are miscible in the melt state, said miscibility being manifested by the diffusion and interpenetration of the molecular chains; then by cooling said materials in order to freeze the state of molecular interpenetration.

Bonding: as opposed to welding, bonding is defined as an operation for joining two materials that are not of the same nature or that are immiscible in the melt state. Bonding may take place by chemical mechanisms (reaction of the chain ends, crosslinking), or physical mechanisms (van der Waals forces, evaporation). Bonding is a joining operation which may be carried out at room temperature or by heating the materials.

Weldable layer: Layer whose main characteristic is to enable and facilitate the preparation of the packaging by welding.

Functional layer: Layer whose main characteristic is the provision of properties other than the ability to be welded. Functional layers that are generally of small thickness are used, for example, to improve the appearance of the packaging (printed layers, transparent layers), to improve the strength of the packaging (biaxially-oriented layers, technical layers), to provide barrier properties (to oxygen, aromas) or to provide functionality (easy tearing in order to open the packaging).

GENERAL SUMMARY OF THE INVENTION

The invention relates to a flexible packaging tube formed from a laminate comprising at least one first layer and one second layer, characterized in that the first layer is formed from a material whose properties make it possible to weld the first layer to itself and in that the second layer is formed from a material whose properties make it impossible to weld the second layer onto the first layer.

Advantageously, the invention comprises:
a first polyolefin-based layer forming the inner surface of the packaging; and
a second layer made of biaxially-oriented polymer forming the outer surface of the packaging.

Preferably, the first layer is a polyethylene layer which may be high-speed welded to itself. A linear low-density polyethylene saver forming the inner face of the packaging is advantageous.

According to one embodiment of the invention, the laminate has a layer having a barrier effect towards oxygen or aromas.

According to another embodiment, the polyolefin-based layers represent at least 60% of the total thickness.

According to another embodiment, the laminate has a thickness of less than 200 microns.

Preferentially, said laminate results from the lamination of only two films.

The tube according to the invention has an improved burst strength, an excellent drop impact strength, very good resistance to stress cracking and good barrier properties.

The tube is made by butt-welding the ends of the laminate and by addition of a thin strip joining the ends of said laminate.

DETAILED SUMMARY OF THE INVENTION

The invention describes a tube having an advantageous multilayer structure. Contrary to what is provided in the prior art, this multilayer structure is especially distinguished by the fact that the inner and outer surfaces of said tube cannot be welded to one another.

The invention, illustrated in FIG. 1, represents the cross section of a flexible tubular body 1 formed by welding the ends of a laminate 2. The laminate 2 comprises at least a first layer 3 forming the outer surface of the tubular body and a second layer 4 forming the inner surface of said tubular body. The layer 4 is composed of polyolefin-based resins and may be easily welded to itself at the butt joint 5 of the ends of the laminate. The inner layer 4 enables the joining of a tube head at the end of the tubular body 1; said tube head possibly being joined by welding or by overmoulding. The layer 4 that is in contact with the packaged product provides the hygiene properties required for preserving the product. Preferably, the polyolefin-based layers represent at least 60% of the thickness of the laminate. The layer 3 forming the outer surface of the laminate is generally used as a medium for the decoration, said decoration possibly being on the surface of the packaging or embedded in the thickness of the laminate. The layer 3 is advantageously a functional layer having a small thickness and a high strength. The layer 3 may also be chosen for its surface properties (feel) and its optical properties (gloss, transparency). Due to the complementarity of their properties, layers 3 and 4 are of different nature and cannot be welded to one another. The layers forming the laminate are joined together with an adhesive and joined according to the methods known to a person skilled in the art. The preparation of the tubular body cannot be carried out by welding an overlap of the ends of the laminate, as the layers 3 and 4 cannot be welded to one another. A method for butt-joining the ends of the laminate is proposed.

According to a preferential embodiment of the invention, the laminate 2 results from the joining of only two films possibly containing several layers, unlike the laminates currently used that require the joining of three films. According to this preferential embodiment of the invention, a first film comprises at least the layer 3 forming the outer layer of the packaging, and the second film comprises at least the layer 5 forming the inner surface of the packaging. Preferably, the first film comprises functional layers and the second film comprises weldable layers.

According to one particularly advantageous embodiment of the invention, the tube 1 is formed from a laminate 2 comprising a biaxially-oriented polymer layer 3 forming its outer surface. The biaxially-oriented polymer layer provides high strength and also optical properties (glass-transparency) that improve the attractiveness of the packaging. According to a first exemplary embodiment of the invention, the laminate comprises a BOPET layer forming the outer surface of the laminate and an LLDPE layer forming the inner surface of the packaging; the two layers being joined together by a thin layer of adhesive. The LLDPE layer represents more than 80% of the thickness of said laminate. In order to improve the impermeability of the multilayer structure to oxygen or to aromas, it is advantageous to add an additional layer having a barrier effect. For example, an EVOH layer may be inserted in the LLDPE layer. Another solution consists in depositing SiOx onto the BOPET layer.

The multilayer structure of the tube proposed in the invention has many advantages. This multilayer structure comprises a reduced number of layers, has a high strength, a low permeability to oxygen or to aromas, and also excellent aesthetic properties. The tube may be decorated over the whole circumference of the tubular body, without discontinuity of the decoration in the weld zone.

A key point of the invention lies in the method for welding the laminate to form the tubular body 1. This is because it is important for the weld zone to have similar properties to that of the laminate so that the packaging has homogeneous properties. The invention proposes a method for joining the ends of the laminate that makes it possible to obtain properties at the weld zone that are at least equal to those of the laminate. Ideally, the weld zone cannot be detected by the user of the packaging; neither aesthetically, nor mechanically.

Figure 2:
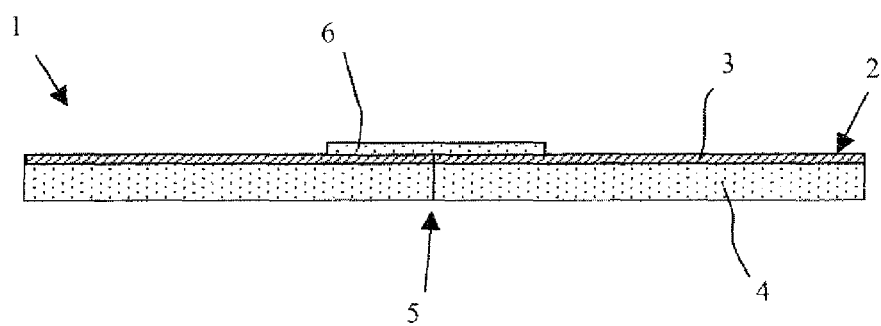

A first method for preparing the tubular body 1 is illustrated in FIG. 2. This method consists in butt-welding the ends of the laminate 2 and in strengthening the weld zone 5 using a strip 6 fixed to the outer surface of the packaging. In general, the butt-welding operation of the ends of the laminate 2 results in a partial joining of said ends, with only the weldable layer 4 being effectively welded. It results in an area of fragility for the tubular body at the weld zone 5, as the layer 3 is not butt-welded. The strip 6 enables the weld zone to be reinforced and compensates for the discontinuity of the layer 3 at the weld. Preferably, the strip 6 comprises a biaxially-oriented polymer layer having a strength greater than or equal to the strength of the layer 3. The strip 6 may be welded or bonded to the layer 3. When the layer 3 is a biaxially-oriented polymer layer, the strip 6 is generally bonded.

Figure 3:
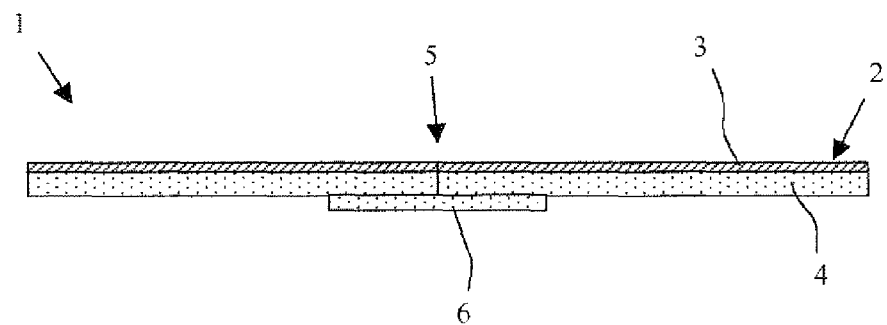

A second method for joining the tubular body 1 is illustrated in FIG. 3. This method consists in butt-welding the ends of the laminate 2 and in strengthening the weld zone 5 using a strip 6 fixed to the inner surface of the packaging. The strip 6 is welded to the layer 4. Preferably, the strip 6 comprises a polyolefin layer of the same nature as the layer 3. Preferably, the strip 6 also comprises a biaxially-oriented polymer layer embedded between two weldable layers.

The weldable layers of the laminate are generally based on polyolefins (polyethylene, polypropylene). Butt-welding brings a very small quantity of material into contact, which makes it more difficult to obtain a strong join. It has been observed that a weldable layer composed of a blend of 80% linear low-density polyethylene and 20% radical low-density polyethylene enabled a strong weld to be obtained.

The functional layers are based on a wide variety of resins (for example: PET, PA, PS, EVOH, PVDC), of which the choice depends on the desired properties. The main functional layers used today are uniaxially- or biaxially-oriented (PP, PET, PA, PS) layers; and films with barrier properties (PET with deposition of an SiOx, PVDC, EVOH, PA coating). A functional layer may also be made of aluminium or paper.

In order to provide barrier properties, the laminate may include an aluminium layer, a PET or OPP barrier layer (with PVOH, PVDC, SiOx, AlOx or metallization coating), or a layer coextruded with an EVOH or PVOH type barrier.

The invention makes it possible to obtain packaging having a negligible variation in the thickness at the weld zone and having a strength at the weld zone that is equivalent to the strength of the laminate. The packaging obtained may be printed over its entire surface without a break in the printing over the weld zone.

The tube structures described previously are particularly advantageous because they enable packaging to be made having improved aesthetic properties; the improvement in the attractiveness of the packaging being linked to the presence of the functional layer 3 at the surface of the packaging and to the fact that the weld zone is barely visible and that the wall of the packaging has a negligible overthickness at the weld zone.

The invention makes it possible to produce economical packaging, having a low thickness and a high strength. The tubes described in the invention may result from the joining of multilayer plastic films but also from films comprising aluminium layers, and paper or cardboard layers.

The thickness of the strip is small considering the thickness of the laminate. In general, the strip thickness is three to ten times smaller than the thickness of the laminate. The thickness of said strip is preferentially between 10 and 60 microns. The strip may be printed or transparent; it may be bonded or welded onto the surface of the laminate; it may contain a barrier layer in order to improve the barrier properties of the joint. The strip may be applied before or after butt-welding of the laminate. The strip may be an adhesive strip which is applied at room temperature, the strip may be bonded by addition of glue at the interface between the laminate and said strip, the strip may be bonded by heating said strip, the strip may be welded. The adhesion strength of the strip to the surface of the laminate is one factor determining the strength of the joint. Too low an adhesion strength leads to the risk of the joint breaking when pressure, tensile, bending, impact or fatigue stresses are applied to the packaging. Thus, it is desired to obtain a strong adhesion between the strip and the laminate so that said strip cannot be separated from said laminate.

The strip may be welded or bonded to the surface of the laminate. It is often favourable to bond the strip to the laminate on the upper surface of the joint forming the outer surface of the packaging. Many adhesives and bonding methods may be envisaged. By way of example, a first method consists in adding a strip to which the adhesive has previously been applied. A first variant of this method is the adhesive strip that can be applied at room temperature, a second variant is an adhesive strip that is bonded by heating. The use of an adhesive strip results in a process that is easy to control and that can easily be scaled up to an industrial level. Another method consists in applying the adhesive to the strip or onto the laminate at the time of joining. The use of two-component reactive adhesives enables high levels of adhesion to be obtained. Generally, the bonding operation does not require any particular surface treatment of the joining area, however it is possible to carry out surface treatments before bonding (for example, corona treatment).

Depending on the mode of application and the properties to be provided, various types of strips exist.

1—The strip is welded: it comprises a layer of weldable PET (coextruded, amorphous, coated), coextruded OPP, PE, PP or heat-sealable coating, for example.

2—The strip is bonded and is coated with adhesive. Its only distinctive feature is having a layer of adhesive at the surface, whether this is an adhesive that can be used at high or low temperature. The adhesive may be deposited in-line or be present on the strip. The strip is then stored in the form of rolls, the adhesive then being protected by a silicone paper or film. The silicone may optionally be deposited directly onto the outer surface of the strip and may thus make it possible to avoid having to remove the silicone protection at the time of fitting the strip.

Any type of material can be used for this strip, in particular the materials described in points 1 and 2, to which paper and aluminium can be added. The definition of the strip will then be guided by the properties, in terms of barrier, mechanical strength, and appearance properties, that are desired.

3—The strip is bonded but is not itself coated with adhesive. The adhesive may be deposited on the film 2 or be deposited in-line. The materials that can be used are the same as for point 1 above.

In order to provide barrier properties, the strip may include an aluminium layer, PET or OPP barrier layer (with PVOH, PVDC, SiOx, AlOx or metallization coating, or any other commercially available film), or a layer coextruded with an EVOH type barrier.

Generally, and in order to ensure continuity of the product properties, the reinforcing strip may include the same functional layers as the films 2 used for the packaging, that is to say PET, OPP, OPA, barrier PET, metallized PET, barrier OPP, metallized OPP, aluminium, paper, PE, PP, etc.

The invention is particularly advantageous for preparing flexible tubes for cosmetic, pharmaceutical or food products.

EXAMPLES OF TUBE STRUCTURE

Example 1

Laminate: BOPET/LLDPE
Layer 3: BOPET—thickness 12 microns
Layer 4: LLDPE—thickness 180 microns
Strip bonded to layer 3: BOPET/adhesive
BOPET—thickness 20 microns
Adhesive: Bostik Vitel 1912

Example 2

Laminate: BOPP PVOH/PE
Layer 3: BOPP PVOH—thickness 30 microns
Layer 4: PE—thickness 200 microns
Strip bonded to layer 3: BOPP/adhesive
BOPP—thickness 40 microns
Adhesive: Bostik TLH 2013

Example 3

Laminate: BOPP/LLDPE
Layer 3: BOPP—thickness 20 microns
Layer 4: LLDPE—thickness 180 microns
Strip welded to layer 4: LLDPE/BOPET/LLDPE
LLDPE—thickness 20 microns
BOPET—thickness 12 microns
LLDPE—thickness 20 microns

Other Laminate Examples

Laminate: PA/LDPE
Layer 3: PA—thickness 40 microns
Layer 4: LDPE—thickness 200 microns
Laminate: PP/PE
Layer 3: PP—thickness 80 microns
Layer 4: PE—thickness 140 microns
Laminate: Kraft/Al/PE
Layer 3: Kraft/Al—thickness 30 microns
Layer 4: PE—thickness 180 microns
Laminate: BOPET/LLDPE EVOH
Layer 3: BOPET—thickness 12 microns
Layer 4: LDPE EVOH LLDPE—thickness 180 microns

The invention claimed is:

1. A flexible packaging tubular body formed from a laminate having ends and comprising at least one first layer and one second layer,
   wherein the first layer is formed from a material whose properties make it possible to weld the first layer to itself, and
   wherein the second layer is formed from a material whose properties make it impossible to weld the second layer onto the first layer;
   the first layer and the second layer forming respectively an inner layer and an outer layer of the tubular body;
   wherein the first layer is formed from a polyolefin,
   the second layer is formed from a biaxially-oriented polymer,
   the tubular body is formed by welding the ends of the laminate,
   the tubular body further comprises a strip fixed to a surface of the tubular body and covering the ends of the laminate, wherein the strip comprises a biaxially-oriented polymer layer having a strength greater than or equal to the strength of the second layer, and
   wherein the thickness of the first layer is greater than the thickness of the second layer.

2. A flexible packaging tubular body according to claim 1, being formed only from the first layer, the second layer, the strip, and a glue.

3. A flexible packaging tubular body according to claim 1, wherein the second layer is formed from a material whose properties make it possible to at least partially weld the second layer to itself.

4. A flexible packaging tubular body according to claim 1, wherein the ends of the laminate are butt-welded.

5. A flexible packaging tubular body according to claim 1, wherein the strip is fixed to an outer surface of the tubular body.

6. A flexible packaging tubular body according to claim 1, wherein the strip is fixed to an inner surface of the tubular body.

* * * * *